United States Patent
Arbel et al.

(10) Patent No.: US 9,720,868 B2
(45) Date of Patent: Aug. 1, 2017

(54) BRIDGING INTER-BUS COMMUNICATIONS

(71) Applicant: Xilinx, Inc., San Jose, CA (US)

(72) Inventors: Ygal Arbel, Morgan Hill, CA (US);
Sagheer Ahmad, Cupertino, CA (US);
Sarosh I. Azad, Fremont, CA (US)

(73) Assignee: XILINX, INC., San Jose, CA (US)

( * ) Notice: Subject to any disclaimer, the term of this patent is extended or adjusted under 35 U.S.C. 154(b) by 424 days.

(21) Appl. No.: 14/325,238

(22) Filed: Jul. 7, 2014

(65) Prior Publication Data

US 2016/0004656 A1    Jan. 7, 2016

(51) Int. Cl.
| | |
|---|---|
| *G06F 13/364* | (2006.01) |
| *G06F 13/40* | (2006.01) |
| *G06F 12/14* | (2006.01) |
| *G06F 21/78* | (2013.01) |
| *G06F 21/85* | (2013.01) |

(52) U.S. Cl.
CPC .......... *G06F 13/404* (2013.01); *G06F 12/145* (2013.01); *G06F 12/1441* (2013.01); *G06F 21/78* (2013.01); *G06F 21/85* (2013.01)

(58) Field of Classification Search
CPC .... G06F 13/364; G06F 13/404; G06F 12/145; G06F 12/1441; G06F 21/78; G06F 21/85
See application file for complete search history.

(56) References Cited

U.S. PATENT DOCUMENTS

| | | |
|---|---|---|
| 2012/0005391 A1 | 1/2012 | Byrne et al. |
| 2013/0047250 A1* | 2/2013 | Kothari ................ H03K 3/0315 726/16 |
| 2013/0077635 A1* | 3/2013 | Deivasigamani ... G06F 13/4045 370/402 |
| 2013/0275701 A1 | 10/2013 | Symes et al. |
| 2014/0089617 A1* | 3/2014 | Polzin ..................... G06F 12/14 711/163 |
| 2014/0173236 A1 | 6/2014 | Kegel |

(Continued)

FOREIGN PATENT DOCUMENTS

| | | |
|---|---|---|
| EP | 1903443 | 3/2008 |
| GB | 2460331 | 12/2009 |
| WO | 2004046924 | 6/2004 |

OTHER PUBLICATIONS

Arm, Arm Security Technology, "Building a Secure System using TrustZone Technology", Apr. 2009, pp. 1-108, XP-002746006, vol. PRD29-GENC-009492C.

*Primary Examiner* — Nimesh G Patel
(74) *Attorney, Agent, or Firm* — LeRoy D. Maunu

(57) ABSTRACT

Approaches for bridging communication between first and second buses are disclosed. Address translation information and associated security indicators are stored in a memory. Each access request from the first bus includes a first requester security indicator and a requested address. Each access request from the first bus and directed to the second bus is either rejected, or translated and communicated to the second bus, based on the requester security indicator and the security indicator associated with the address translation information for the requested address. Each access request from the second bus to the first bus includes the requested address, and the access request is translated and communicated to the first bus along with the security indicator that is associated with the address translation information for the requested address.

20 Claims, 3 Drawing Sheets

(56) References Cited

U.S. PATENT DOCUMENTS

| | | | | |
|---|---|---|---|---|
| 2014/0359044 A1* | 12/2014 | Davis | ................. | H04L 45/60 709/213 |
| 2015/0227462 A1* | 8/2015 | Grocutt | ............... | G06F 12/0813 711/147 |
| 2016/0125201 A1* | 5/2016 | Villatel | ............... | G06F 21/6281 726/30 |

* cited by examiner

BRIDGING INTER-BUS COMMUNICATIONS

FIELD OF THE INVENTION

The disclosure generally relates to bridging communications between buses.

BACKGROUND

A bus is an interconnect subsystem, or circuit, that transfers data between different devices within an electronic circuit. A bus defines a set of rules and connections that must be observed by each device connected to the bus in order to effectively communicate via the bus. Examples of devices that may be connected to a bus can include, but are not limited to, processors, memories, and bridges to external systems, for example. Unlike a point-to-point connection, a bus can connect several peripherals over the same set of wires.

Many electronic systems include multiple buses to facilitate data transfer among multiple devices in parallel. In some systems, data may be transferred from a bus that implements one protocol to a bus that implements another, different protocol. Compatibility issues may arise from connecting buses that implement different protocols. For example, the Advanced eXtensible Interface (AXI) for the Advanced Microcontroller Bus Architecture (AMBA) supports software-controlled and hardware-enforced isolation of secure and non-secure resources that are connected to the bus. A Peripheral Component Interconnect express (PCIe) bus architecture, in contrast, does not provide similar security. With different buses having different features, connecting the buses may be problematic.

SUMMARY

In one embodiment, a method of bridging communication between first and second buses includes storing address translation information and associated security indicators in a memory. Each first access request received from the first bus includes a first requester security indicator and a first address. In response to each first access request, the method rejects the first access request in response to the first requester security indicator indicating a non-secure requester and the security indicator associated with the address translation information for the first address indicating a secure address range. The first access request is translated into a second access request for the second bus using the address translation information and the second access request is communicated to the second bus in response to the first requester security indicator indicating a secure requester. Each third access request received from the second bus includes a third address. In response to each third access request, the method translates the third access request into a fourth access request for the first bus using the address translation information and communicates the fourth access request to the first bus, along with the security indicator that is associated with the address translation information for the fourth address.

In another embodiment, a bridge circuit for communications between first and second buses includes a memory that is configurable to store address translation information and associated security indicators. An egress circuit is coupled to the memory and to the first and second bus. The egress circuit is configured to receive first access requests from the first bus, and each first access request includes a first requester security indicator and a first address. For each first access request, the egress circuit is configured to reject the first access request in response to the first requester security indicator indicating a non-secure requester and the security indicator associated with the address translation information for the first address indicating a secure address range. The egress circuit translates the first access request into a second access request for the second bus using the address translation information and communicates the second access request to the second bus, in response to the first requester security indicator indicating a secure requester. An ingress circuit is coupled to the memory and to the first and second bus. The ingress circuit is configured to receive third access requests from the second bus, and each third access request includes a third address. The ingress circuit is further configured to translate the third access request into a fourth access request for the first bus using the address translation information, and communicate the fourth access request to the first bus along with the security indicator that is associated with the address translation information for the fourth address.

A system is provided in another embodiment. The system includes a first bus, a first set of master and slave circuits coupled to the first bus, a second bus, a bridge circuit intercoupled between the first bus and the second bus, and a second set of master and slave circuits coupled to the second bus. The bridge circuit includes a memory that is configurable to store address translation information and associated security indicators. An egress circuit is coupled to the memory and to the first and second bus. The egress circuit is configured to receive first access requests from the first bus, and each first access request includes a first requester security indicator and a first address. For each first access request, the egress circuit is configured to reject the first access request in response to the first requester security indicator indicating a non-secure requester and the security indicator associated with the address translation information for the first address indicating a secure address range. The egress circuit translates the first access request into a second access request for the second bus using the address translation information and communicates the second access request to the second bus, in response to the first requester security indicator indicating a secure requester. An ingress circuit is coupled to the memory and to the first and second bus. The ingress circuit is configured to receive third access requests from the second bus, and each third access request includes a third address. The ingress circuit is further configured to translate the third access request into a fourth access request for the first bus using the address translation information, and communicate the fourth access request to the first bus along with the security indicator that is associated with the address translation information for the fourth address.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION OF THE DRAWINGS

Figure 1:
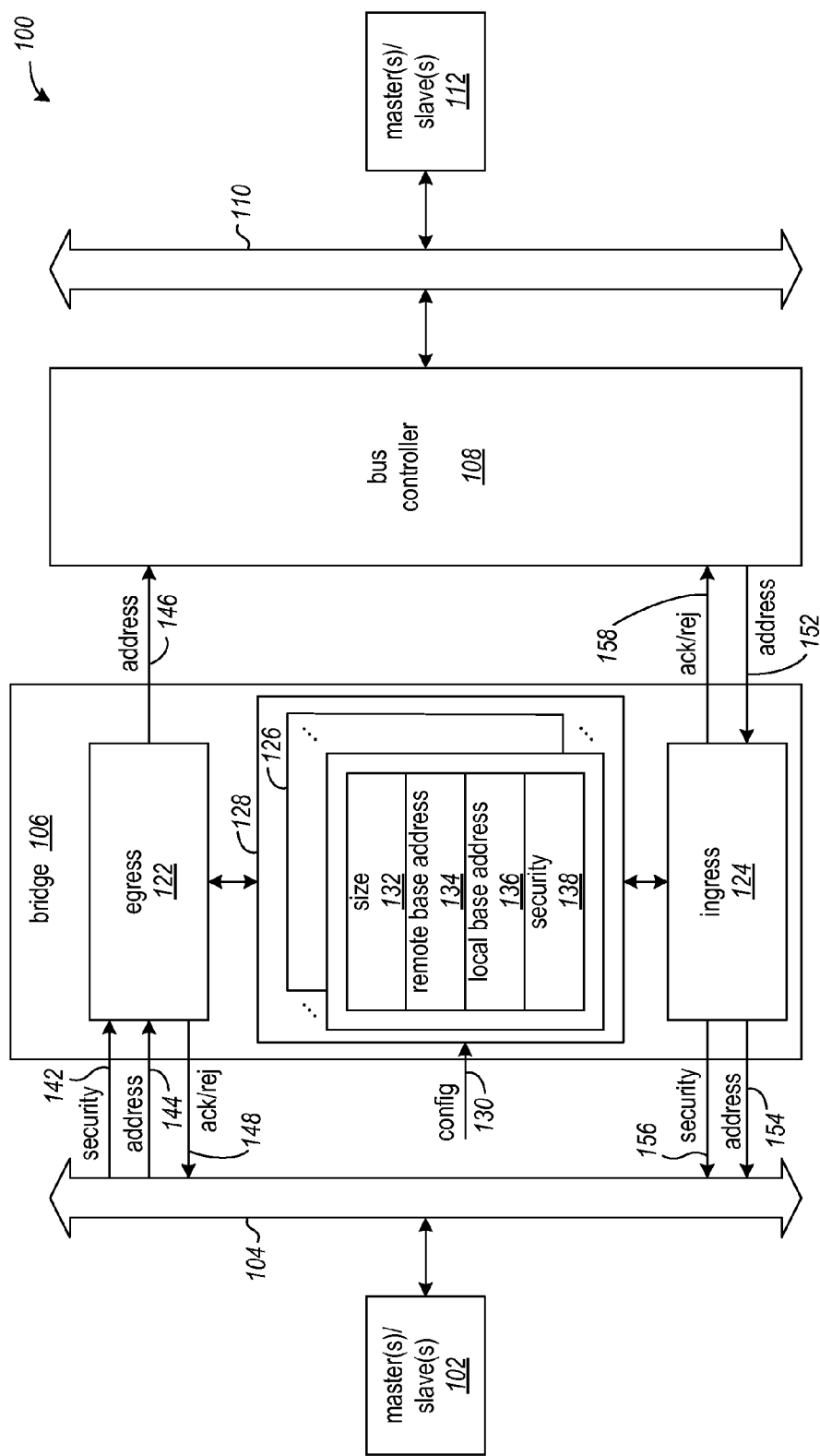
FIG. 1 shows a system that includes a bridge circuit for communicating between a first bus that provides hardware-enforced control over secure and non-secure resources, and a second bus that does not recognize the security mechanisms of the first bus.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same items; however, in alternative examples the items may be different.

The disclosed bridge circuit accommodates security measures implemented by a first bus in bridging communications to a second bus that does not implement the security mechanisms of the first bus. According to one approach, the bridge circuit stores address translation information and associated security indicators. The address translation information is used to translate addresses between the address space of the first bus and the address space of the second bus. The security indicators associated with the address translation information are configurable such that different address ranges may have different security designations.

Access requests received by the bridge circuit from the first bus reference a requested address and have an associated requester security indicator. The requested address references an address in the first address space of the first bus, and the requester security indicator indicates a security setting of the requester. For example, the security setting of the requester may be secure or non-secure.

The bridge circuit rejects an access request from a requester on the first bus to a destination on the second bus in response to the requester security indicator indicating that the requester is non-secure, and the security indicator associated with the address translation information for the requested address indicating a secure address range. If the requester security indicator indicates that the requester is non-secure and the requested address range is non-secure, the bridge circuit translates the access request into an access request for the second bus using the address translation information. If the requester security indicator indicates that the requester is secure, the bridge circuit translates the access request into an access request for the second bus using the address translation information for both secure and non-secure address ranges. The translated access request is communicated to the second bus.

Access requests received by the bridge circuit from the second bus reference a requested address, but there is no associated requester security indicator. The requested address references an address in the second address space of the second bus. For the request received over the second bus, the bridge circuit translates the request into an access request for the first bus using the address translation information. The bridge circuit then communicates the translated access request, along with the security indicator that is associated with the address translation information, on the first bus.

FIG. 1 shows a system 100 that includes a bridge circuit for communicating between a first bus that provides hardware-enforced control over secure and non-secure resources, and a second bus that does not recognize the security mechanisms of the first bus. Though not shown, it will be appreciated that the bridge and buses provide data channels in addition to the illustrated address channels.

System 100 includes a first set of master and slave circuits 102 that are coupled to a first bus 104, a bridge circuit 106, a bus controller 108, a second bus 110, and a second set of master and slave circuits 112 coupled to the second bus. The first set of master and slave circuits 102 may include one or more master circuits and one or more slave circuits, and the second set of master and slave circuits 112 may include one or more master circuits and one or more slave circuits. Examples of the master circuits include microprocessors, direct memory access (DMA) circuits, and/or digital signal processors (DSPs). Examples of slave circuits include flash memory devices, solid state drives, or hard disk drives. The bridge circuit 106 is an example of a slave circuit on the first bus 104.

The bridge circuit 106 translates requests between the first bus 104 and the second bus 110. The buses may have different address spaces, different physical configurations, and different security mechanisms. For example, bus 104 may be a parallel bus such as an AXI bus, and bus 110 may be a serial bus such as PCIe. The AXI bus also isolates secure and non-secure resources. On the AXI bus, each device may be assigned a security profile that indicates whether the device is secure or non-secure. Memory access transactions are tagged to indicate the security level of the requester, and the tags are propagated throughout the interconnect system. Non-secure master devices or software tasks are permitted access to only non-secure memory regions or slave devices. Secure master devices or software tasks are permitted access to both secure and non-secure memory regions. On the AXI bus, transaction security is indicated by the state of the AxPROT[1] signal (x denotes R for the read channel and W for the write channel), which is comparable to security indicator 142. On the PCIe bus, there is no similar security information transmitted with transactions.

The egress circuit 122 translates requests from requesters (master circuits) on the first bus 104 into requests that are suitable for slave circuits on the second bus 110. The ingress circuit 124 translates requests from requesters on the second bus 110 into requests that are suitable for slave circuits on the first bus 104. The egress and ingress translation circuits translate addresses between the two address spaces and enforce the security mechanism of the first bus using address range maps 126. The address range maps may be implemented in one or more dual port memories 128, for example. In an example implementation, the address range maps 126 may be configurable via configuration signal 130.

Each address range map describes a respective range of addresses. The information in an address range map specifies the size 132 of the address range, a remote base address 134, a local base address 136, and a security indicator 138. The size of the address range indicates the number of addressable words in the range, for example. The remote base address indicates the base address in the address space of the second bus 110 at which the address range begins, and the local base address indicates the base address in the address space of the first bus 104 at which the address range begins. The security indicator 138 indicates whether or not the address range is secure or non-secure.

The egress circuit receives access requests from the first bus 104. Each access request, which may also be referred to herein as a transaction, includes a requester security indicator 142 and an address 144. The security indicator specifies the security level, for example, secure or non-secure, of the master circuit that initiated the request, and the address references an address of the address space of the first bus 104. In response to an access request, the egress circuit determines whether or not the request will be translated and communicated to the second bus 110 based on the requester security indicator and the security indicator associated with the requested address. If the requester security indicator indicates that the requester is secure, the egress circuit translates the access request from the first bus into an access request for the second bus. In particular, the requested address is translated using the one of the address maps 126 that specifies an address range into which the requested address falls (local base address<=requested address<=(local base address+size)). The address 146 output by the egress circuit is an address in the address space of the second bus 110 and equals: (requested address−local base address)+remote base address. If the requester security indicator indicates a non-secure requester and the address translation information for the requested address indicates a non-secure address range, the egress circuit translates the access request as indicated above. The egress circuit rejects an access request in response to the requester security indicator indicating that the requester is non-secure and the security indicator associated with the address range indicating that the requested address is within a secure address range. The rejection may be indicated with a reject signal 148 from the egress circuit.

The ingress circuit 124 receives and processes requests from requesters on the second bus 110 that are addressed to devices on the first bus 104. Requests from the second bus include a requested address 152 but do not include a requester security indicator as do the requests from the first bus 104. The ingress circuit translates the access request from the second bus 110 into an access request for the first bus 104 using one of the address range maps. The one address range map is that for which the (remote base address<=requested address<=(remote base address+size)). The address 154 output by the ingress circuit is an address in the address space of the first bus 104 and is (requested address−remote base address)+local base address. Along with the address 154, the ingress circuit communicates the security indicator 156 that is associated with the address range for the requested address. Thus, the security indicators associated with the address ranges indicate the requester security level for all the master circuits 112 submitting access requests to the first bus 104. Acknowledge and reject signals are provided to the bus controller 108 on signal line 158.

The bus controller provides an interface between the bridge circuit 106 and the second bus 110. In an implementation in which bus 110 provides a serial link, such as the Peripheral Component Interconnect express (PCIe), the bus controller may include transaction, link, and physical layers of circuits.

Figure 2:
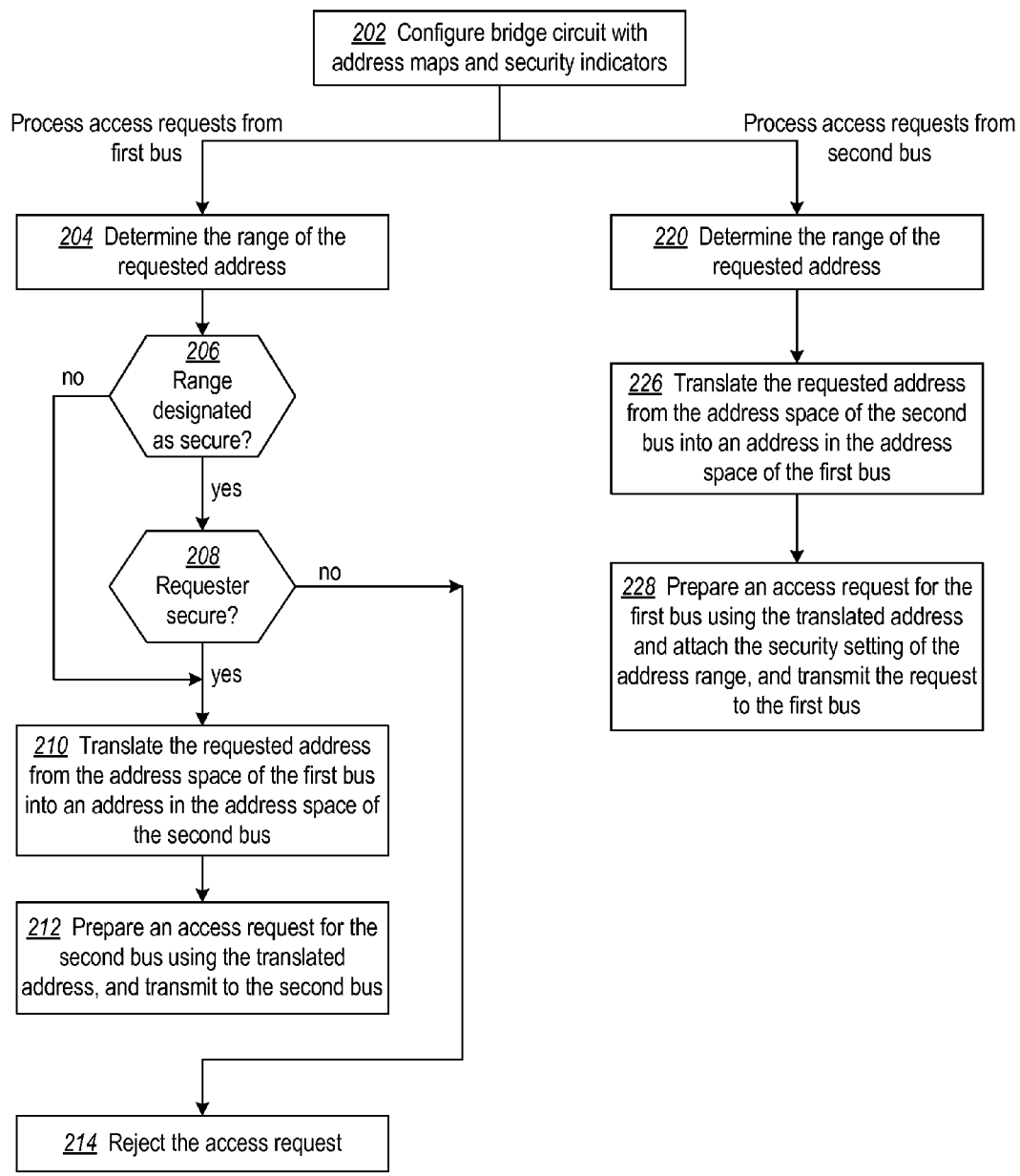
FIG. 2 is a flowchart of an example process for bridging communications between a first bus and a second bus.

FIG. 2 is a flowchart of an example process for bridging communications between a first bus and a second bus. At block 202, the address maps are configured with address translation information for translating requests between first and second buses. Each address range map specifies a size, remote base address, local base address, and a security indicator for a respective range of addresses.

For access requests from the first bus (the bus that implements security measures), the process proceeds to block 204. At block 204, the address range of the address in the access request is determined. Decision block 206 determines whether or not the range is designated as secure. If the range is secure, decision block 208 determines whether or not the requester is secure as indicated by the signal that accompanies the access request. If the requester is secure, at block 210, the process translates the address of the request from the address space of the first bus into the address space of the second bus. At block 212, an access request is prepared with the translated address and communicated to the second bus. If the requester is not secure and the requested address is within an address range designated as secure, decision block 208 directs the process to block 214 where the access request is rejected with a signal to the requester.

For access requests from the second bus (the bus that does not implement the security measures of the first bus), the address range of the address in the access request is determined at block 220. At block 226, the address range map is used to translate the address from the address space of the second bus to an address of the address space of the first bus. An access request is prepared with the translated address, and the access request and the state of the security indicator from the address range map are communicated to the first bus at block 228. The device on the first bus receiving the access request can decide whether to grant access or reject the request.

Figure 3:
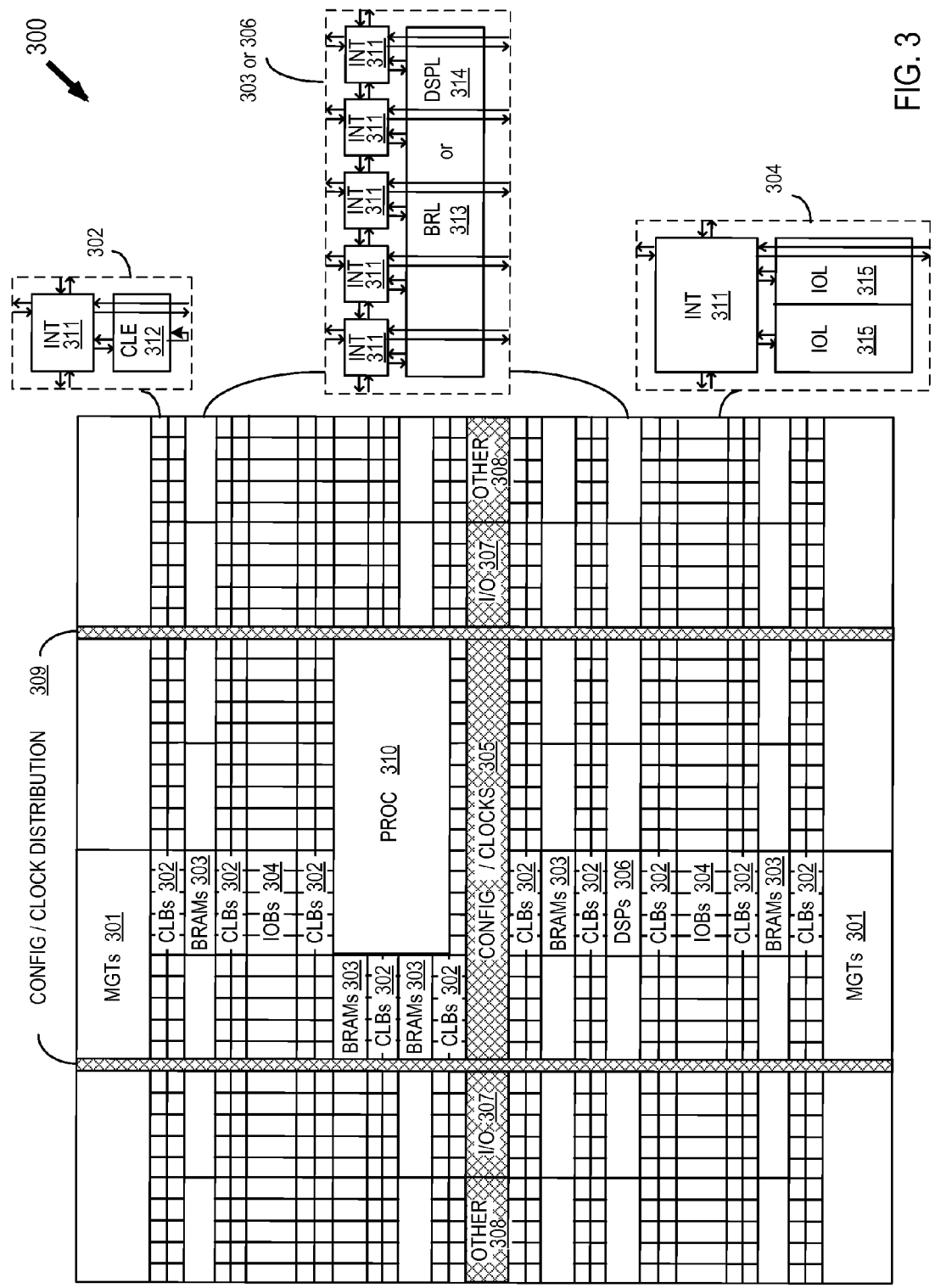
FIG. 3 show a programmable integrated circuit (IC) on which the bridging circuit of FIG. 1 and the process of FIG. 2 may be implemented.

FIG. 3 shows a programmable integrated circuit (IC) on which the bridging circuit of FIG. 1 and the process of FIG. 2 may be implemented. The programmable IC of FIG. 3 illustrates an FPGA architecture (300) that includes a large number of different programmable tiles including multi-gigabit transceivers (MGTs) 301, configurable logic blocks (CLBs) 302, random access memory blocks (BRAMs) 303, input/output blocks (IOBs) 304, configuration and clocking logic (CONFIG/CLOCKS) 305, digital signal processing blocks (DSPs) 306, specialized input/output blocks (I/O) 307, for example, clock ports, and other programmable logic 308 such as digital clock managers, analog-to-digital converters, system monitoring logic, and so forth. Some FPGAs also include dedicated processor blocks (PROC) 310 and internal and external reconfiguration ports (not shown).

In some FPGAs, each programmable tile includes a programmable interconnect element (INT) 311 having standardized connections to and from a corresponding interconnect element in each adjacent tile. Therefore, the programmable interconnect elements taken together implement the programmable interconnect structure for the illustrated FPGA. The programmable interconnect element INT 311 also includes the connections to and from the programmable logic element within the same tile, as shown by the examples included at the top of FIG. 3.

For example, a CLB 302 can include a configurable logic element CLE 312 that can be programmed to implement user logic, plus a single programmable interconnect element INT 311. A BRAM 303 can include a BRAM logic element (BRL) 313 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 306 can include a DSP logic element (DSPL) 314 in addition to an appropriate number of programmable interconnect elements. An 10B 304 can include, for example, two instances of an input/output logic element (IOL) 315 in addition to one instance of the programmable interconnect element INT 311. As will be clear to those of skill in the art, the actual I/O bond pads connected, for example, to the I/O logic element 315, are manufactured using metal layered above the various illustrated logic blocks, and typically are not confined to the area of the input/output logic element 315.

In the pictured embodiment, a columnar area near the center of the die (shown shaded in FIG. 3) is used for configuration, clock, and other control logic. Horizontal areas 309 extending from this column are used to distribute the clocks and configuration signals across the breadth of the FPGA.

Some FPGAs utilizing the architecture illustrated in FIG. 3 include additional logic blocks that disrupt the regular columnar structure making up a large part of the FPGA. The additional logic blocks can be programmable blocks and/or dedicated logic. For example, the processor block PROC 310 shown in FIG. 3 spans several columns of CLBs and BRAMs.

Note that FIG. 3 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 3 are purely exemplary. For example, in an actual FPGA, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for bridging communications between different buses. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method of bridging communication between first and second buses, comprising:
storing address translation information and associated security indicators in a memory;
in response to each first access request received from the first bus, each first access request including a first requester security indicator and a first address:
rejecting the first access request in response to the first requester security indicator indicating a non-secure requester and the security indicator associated with the address translation information for the first address indicating a secure address range; and
translating the first access request having the first address into a second access request having a second address for the second bus using the address translation information and communicating the second access request to the second bus, in response to the first requester security indicator indicating a secure requester; and
in response to each third access request received from the second bus and including a third address:
translating the third access request having the third address into a fourth access request having a fourth address for the first bus using the address translation information; and
communicating to the first bus the fourth access request and the security indicator that is associated with the address translation information for the fourth address.

2. The method of claim 1, wherein the address translation information includes a plurality of address range maps, each address range map maps a first range of addresses of the first bus to a second range of addresses of the second bus, and each of the security indicators is associated with one of the address range maps, respectively.

3. The method of claim 1, further comprising in response to the first requester security indicator indicating a non-secure requester and the address translation information for the first address indicating a non-secure address range, translating the first access request into the second access request for the second bus and communicating the second access request to the second bus.

4. The method of claim 1, wherein:
the address translation information includes a plurality of address range maps, each address range map maps a first range of addresses of the first bus to a second range of addresses of the second bus, and each of the security indicators is associated with one of the address range maps, respectively; and
each address range map specifies a first base address and a second base address.

5. The method of claim 4, wherein each address range map specifies a size.

6. The method of claim 5, wherein the first base address is in a first address space of the first bus, and the second base address is in a second address space of the second bus.

7. The method of claim 1, wherein the security indicator is programmable.

8. A bridge circuit for communications between first and second buses, comprising:
a memory that is configurable to store address translation information and associated security indicators;
an egress circuit coupled to the memory and to the first and second buses, wherein the egress circuit is configured to receive first access requests from the first bus, each first access request including a first requester security indicator and a first address, and for each first access request, the egress circuit is configured to:
reject the first access request in response to the first requester security indicator indicating a non-secure requester and the security indicator associated with the address translation information for the first address indicating a secure address range; and
translate the first access request having the first address into a second access request having a second address for the second bus using the address translation information and communicate the second access request to the second bus, in response to the first requester security indicator indicating a secure requester; and
an ingress circuit coupled to the memory and to the first and second buses, wherein the ingress circuit is configured to receive third access requests from the second bus, each third access request including a third address, the ingress circuit further configured to:
translate the third access request having the third address into a fourth access request having a fourth address for the first bus using the address translation information; and communicate to the first bus the fourth access request and the security indicator that is associated with the address translation information for the fourth address.

9. The circuit of claim 8, wherein the address translation information includes a plurality of address range maps, each address range map maps a first range of addresses of the first bus to a second range of addresses of the second bus, and each of the security indicators is associated with one of the address range maps, respectively.

10. The circuit of claim 8, wherein the egress circuit is further configured to, in response to the first requester security indicator indicating a non-secure requester and the address translation information for the first address indicating a non-secure address range, translate the first access request into the second access request for the second bus and communicate the second access request to the second bus.

11. The circuit of claim 8, wherein:
the address translation information includes a plurality of address range maps, each address range map maps a first range of addresses of the first bus to a second range of addresses of the second bus, and each of the security indicators is associated with one of the address range maps, respectively; and
each address range map specifies a first base address and a second base address.

12. The circuit of claim 11, wherein each address range map specifies a size.

13. The circuit of claim 12, wherein the first base address is in a first address space of the first bus, and the second base address is in a second address space of the second bus.

14. The circuit of claim 8, wherein the security indicator is programmable.

15. A system comprising:
a first bus;
a first set of master and slave circuits coupled to the first bus;
a second bus;
a bridge circuit intercoupled between the first bus and the second bus;
a second set of master and slave circuits coupled to the second bus;
wherein the bridge circuit includes:
a memory that is configurable to store address translation information and associated security indicators;
an egress circuit coupled to the memory and to the first and second buses, wherein the egress circuit is configured to receive first access requests from the first bus, each first access request including a first requester security indicator and a first address, and for each first access request, the egress circuit is configured to:
reject the first access request in response to the first requester security indicator indicating a non-secure requester and the security indicator associated with the address translation information for the first address indicating a secure address range; and
translate the first access request having the first address into a second access request having a second address for the second bus using the address translation information and communicate the second access request to the second bus, in response to the first requester security indicator indicating a secure requester; and
an ingress circuit coupled to the memory and to the first and second buses, wherein the ingress circuit is configured to receive third access requests from the second bus, each third access request including a third address, the ingress circuit further configured to:
translate the third access request having the third address into a fourth access request having a fourth address for the first bus using the address translation information; and
communicate to the first bus the fourth access request and the security indicator that is associated with the address translation information for the fourth address.

16. The system of claim 15, wherein the address translation information includes a plurality of address range maps, each address range map maps a first range of addresses of the first bus to a second range of addresses of the second bus, and each of the security indicators is associated with one of the address range maps, respectively.

17. The system of claim 15, wherein the egress circuit is further configured to, in response to the first requester security indicator indicating a non-secure requester and the address translation information for the first address indicating a non-secure address range, translate the first access request into the second access request for the second bus and communicate the second access request to the second bus.

18. The system of claim 15, wherein:
the address translation information includes a plurality of address range maps, each address range map maps a first range of addresses of the first bus to a second range of addresses of the second bus, and each of the security indicators is associated with one of the address range maps, respectively; and
each address range map specifies a first base address and a second base address.

19. The system of claim 11, wherein each address range map specifies a size.

20. The system of claim 12, wherein the first base address is in a first address space of the first bus, and the second base address is in a second address space of the second bus.

* * * * *